Aug. 3, 1937.                 D. HAGE                  2,088,788
            VALVE, ESPECIALLY FOR PNEUMATIC TIRES
                      Filed March 25, 1936
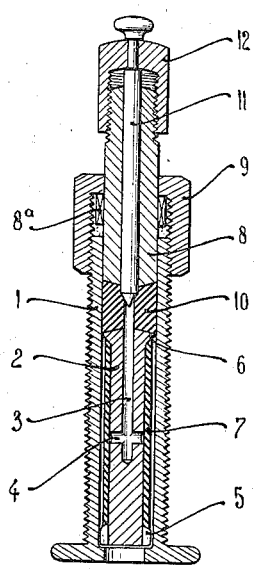
Inventor:
David Hage,
By ............
                        Atty.

Patented Aug. 3, 1937

2,088,788

UNITED STATES PATENT OFFICE 2,088,788

VALVE, ESPECIALLY FOR PNEUMATIC TIRES

David Hage, Hoorn, Netherlands

Application March 25, 1936, Serial No. 70,775
In the Netherlands March 27, 1935

4 Claims. (Cl. 152—12)

This invention relates to valves, particularly for use in connection with inflatable tires, although not restricted to such use, and has generally in view to provide, in a valve of the check valve type including a member operable to permit flow of fluid through the valve in one direction and to deny flow of fluid through the valve in an opposite direction, novel means of a simple, reliable nature, independent of the check valve member, for preventing flow of fluid through the valve in the last mentioned direction, whereby the check valve member need not insure a perfect seal to prevent leakage of fluid through the valve.

With the foregoing general object in view, the invention consists in a valve embodying the novel features of construction, combination and arrangement of parts as will be hereinafter more fully described, illustrated in the accompanying drawing and defined in the appended claims.

The annexed drawing illustrates by way of example a sectional elevation of a valve in accordance with my invention.

The inner portion of the metallic, exteriorly threaded tubular valve casing 1 houses with a certain amount of clearance a metallic element 2 having a longitudinal passage 3 and lateral passages 4, said element being provided with projections 5 by means of which it rests upon the apertured bottom of the casing 1, and with an enlarged head 6. Intermediate this head and the projections 5, the element 2 is surrounded by a thin-walled rubber tube 7 closing the lateral passages 4. A nut 9 screwed on the top portion of the casing 1 is adapted to engage projections 8a of a gland member 8 and, when tightened, to force said member into the casing 1 so as to axially compress and thereby radially expand a thick-walled rubber body 10 of hollow cylindrical shape located within the casing intermediate the head 6 and the gland member 8. By this radial expansion, the outer wall of the packing body 10 is tightly forced against the inner wall of the casing 1, and thus ensures a perfect seal.

The gland member 8 has an axial bore for guiding a valve needle 11. Said valve needle is mounted for rotation, but locked against axial movement relative to a cap 12 having female thread cooperating with male thread on the outer end of the gland member 8, so that proper rotation of the cap 12 relative to the gland causes the lower conical end of the needle to enter into sealing engagement with the edge of the top opening of the body 10. Owing to this extra seal, it is not necessary for the rubber tube 7 to form an air-tight closure for the passages 4.

It will be understood that the body 10 may be composed of two or more parts.

What I claim is:—

1. A valve comprising, in combination, a casing, a check valve structure within said casing, an expansible packing body within said casing seated at its inner end against a part of said check valve structure, said packing body having a duct for flow of fluid therethrough to said check valve structure, a gland member engaging the outer end of said packing body, means for forcing said gland member inwardly to expand said packing body into fluid tight engagement with the casing, said gland member having a duct communicating with the duct in said packing body, a manually operable valve extending through the duct in said gland member into sealing cooperation with said packing member, and means adjustably, removably mounting said manually operable valve on said gland member.

2. A valve comprising, in combination, a casing having an opening in its inner end and provided with an abutment, a check valve structure insertable into said casing through the outer end thereof, and including a body member seated against said abutment, said body member having a check valve controlled duct for flow of fluid therethrough to the opening in the inner end of said casing, an expansible packing body within the casing seated at its inner end against the outer end of said body member, said packing body having a duct for flow of fluid to said check valve structure, a gland member slidable in the outer end portion of the casing, means for forcing said gland member inwardly against said packing body to expand same into fluid tight engagement with the casing, said gland member having a duct communicating with the duct in said packing body, and a manually operable valve carried by said gland member for sealing cooperation with said packing body.

3. A valve as set forth in claim 2 in which the means for forcing the gland member inwardly comprises a nut threaded on the casing and rotatably engaging the gland member.

4. A valve as set forth in claim 2 in which the manually operable valve comprises a stem extending through the duct in the gland member and a nut threaded on the gland member and having a swivel connection with said stem.

DAVID HAGE.